Oct. 5, 1965 M. P. FORRER 3,210,594
GATING DEVICE FOR MICROWAVE SIGNALS
Filed Sept. 18, 1961 2 Sheets-Sheet 1
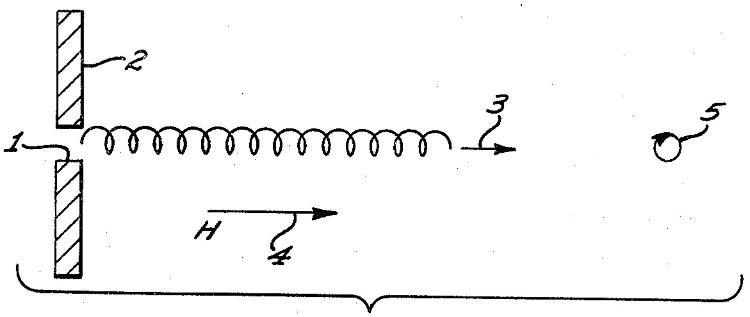
FIG. 1
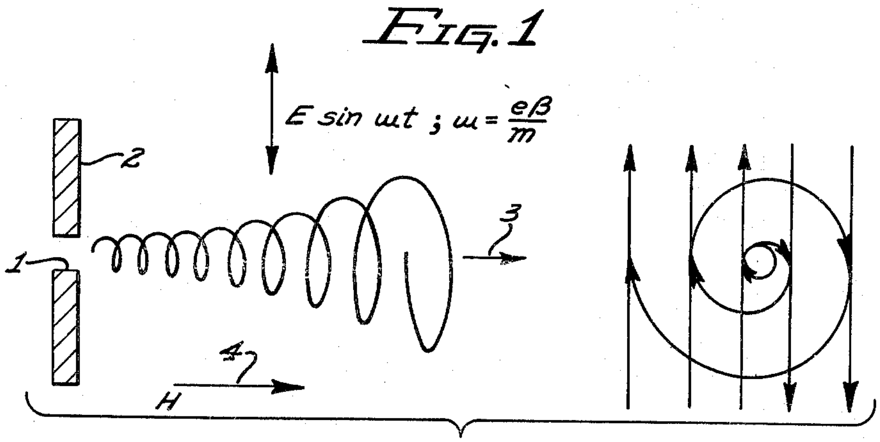
FIG. 2
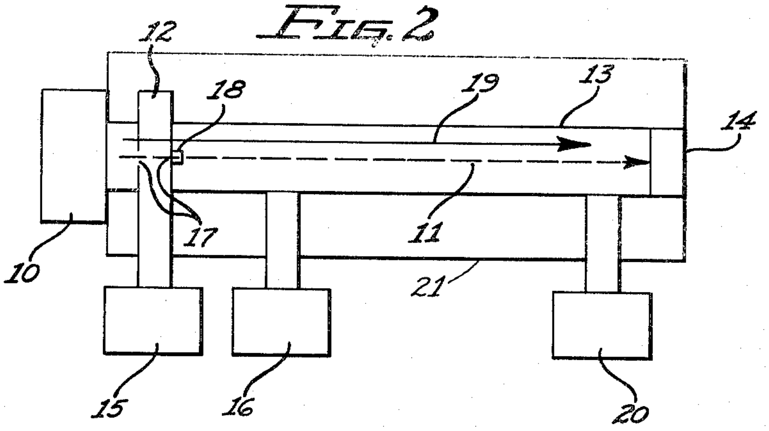
FIG. 3
| A \ B | 0 | 1 |
|---|---|---|
| 0 | 0 | 1 |
| 1 | 0 | 0 |
FIG. 7
INVENTOR.
MAX P. FORRER.
BY William C. Cahill INVENTOR.
MAX P. FORRER.
BY William C. Cahill United States Patent Office
3,210,594
Patented Oct. 5, 1965

3,210,594
GATING DEVICE FOR MICROWAVE SIGNALS

Max P. Forrer, Palo Alto, Calif., assignor to General Electric Company, a corporation of New York Filed Sept. 18, 1961, Ser. No. 138,774
12 Claims. (Cl. 315—3.6)

This invention relates to signal gating, and more particularly, to devices for gating microwave signals.

In the processing of information, such as data, various logical and arithmetic operations are performed thereon. These operations are performed at relatively high speeds by the more modern data processing systems, which are primarily electronic; i.e., these systems operate on electrical signals representing data by means of electron tubes, diodes and transistors. It has been found by experience that these electronic data processing systems are most reliable when the electronic portions thereof need handle only data which is basically of binary digital form. In binary digital data processing systems, each element of information, termed a "bit," is represented by either a 1 or a 0. In the binary digital data processing systems of the prior art, it has been customary to represent these bits by the presence and absence of electrical signals at specified locations in the system at predetermined times; for example, an electronic gate may be "opened" at a particular time by a system "clock" signal and if there is an input data signal applied to the gate at that moment, the numeral 1 is said to be present, whereas if there is no input signal applied to the gate, the numeral 0 is said to be present.

Inasmuch as it is desirable to operate data processing systems at high rates of speed, these clock signals must recur at a rapid rate. This rate of recurrence is known as the "clock rate." In a typical prior art electronic data processing system a clock rate of 100,000 clock signals per second is employed and, consequently, the data signals appearing at various utilization locations in such system must represent 100,000 bits per second. Thus, the duration of the electrical signal representing the binary 1 must be very short (in the above example, less than 10 microseconds duration) and, hence, this signal is actually an electrical pulse. The simulation of binary digital data by the presence and absence of electrical pulses may be termed "pulse no-pulse" script.

In order to process data at increasing speeds, system clock rates must be increased. However, the maximum frequencies at which conventional electron tube, diode and transistor circuit elements can effectively amplify or transmit electrical signals, place a serious upper limit on the clock rate of the above-mentioned prior art electronic data processing systems. The relatively narrow bandwidth for which circuit elements of these prior art systems can effectively amplify and transmit electrical signals is another serious obstacle which impedes efforts to accommodate clock rate increases and their accompanying increased bandwidths. Therefore, if it is desired to build an effective high speed data processing system employing clock pulse signals of the order of one millimicrosecond duration ($10^{-9}$ seconds) recurring at rates of approximately $10^9$ pulses per second, it is desirable to employ traveling-wave tubes as active circuit elements since amplifiers employing traveling-wave tubes are well known for their ability to amplify rapidly changing signals constituting a broad range of frequencies.

The utilization of traveling-wave tubes, and frequencies in the microwave range of the frequency spectrum in a computer system, presents problems which are unsolvable by conventional lower frequency techniques. These problems, among others, include gating of microwave signals, reshaping signal pulses, and synchronizing the microwave signals present at various locations in the computer system. The present invention provides a device that may be incorporated in a microwave computer to obviate these problems.

Accordingly, it is an object of the present invention to provide apparatus for gating high frequency electromagnetic signals.

It is another object of the present invention to provide a gate useful in microwave computers.

It is still another object of the present invention to provide apparatus for reshaping microwave signals.

It is a further object of the present invention to provide apparatus for synchronizing microwave signals.

Further objects and advantages of the present invention will become apparent as the description thereof proceeds.

Briefly, in accordance with one embodiment of the present invention, a means is provided for inhibiting the flow of an electron stream in a traveling-wave tube amplifier. A stream of electrons, emanating from an electron source, is directed along an axis to a collector electrode. A slow-wave structure, which may be of the well-known helix type, is provided in the vicinity of the electron stream to enable an electromagnetic wave propagating therealong to interact with the electron stream. An input signal source is coupled to one end of the slow-wave structure, and an output signal is derived from the slow-wave structure at the collector end thereof. A wave guiding means, such as a hollow rectangular wave guide, is positioned between the electron source and the slow wave structure. Suitable openings are provided in the wave guiding structure to permit the electron stream to flow therethrough. A grid, comprising a plurality of adjacent parallel passages, is placed in the exit opening of the wave guiding structure, and is arranged to permit the electron stream to flow through the wave guiding structure in the absence of any electromagnetic waves traveling along the wave guiding structure. A magnetic field is provided along the axis and parallel to the electron stream; the magnetic field may be the focusing magnetic field for the electron stream. The wave guiding structure is coupled to a source of electromagnetic signals for inhibiting the flow of electrons by inducing a cyclotron resonance effect.

When no signals are present in the wave guiding structure, input signals applied at an input terminal and coupled to the slow-wave structure are amplified and delivered through the output coupling to an output terminal in a manner similar to a traveling-wave tube amplifier. When an electromagnetic signal is applied to the wave guiding structure to sustain a transverse electric field therein, the transverse electric field acts upon the electron stream to deflect the electrons therein and cause an increase in the individual electron orbit diameter. The electromagnetic signal applied to the wave guiding structure is provided with a frequency substantially equal to the electron cyclotron frequency of the electrons in the electron stream; therefore, a cyclotron resonance effect occurs, and the individual electron orbit diameter will continue to increase as the electron travels across the wave guiding structure. The "spiraling" path of the individual electrons is interrupted by the grid structure at the exit opening of the wave guiding structure, and the electron stream is therefore effectively prevented from entering the vicinity of the slow-wave structure. Accordingly, no amplification of the input signal to the slow-wave structure occurs.

The invention, both as to its organization and operation together with further objects and advantages thereof, may best be understood by reference to the following description taken in connection with the accompanying drawings in which:

FIGS. 1 and 2 are diagrams illustrating the phenomenon of electron cyclotron resonance.

FIG. 3 is a block diagram of an apparatus constructed in accordance with the teachings of the present invention.

FIG. 7 is a truth table illustrating the logical function of Inhibit.

Figure 4:
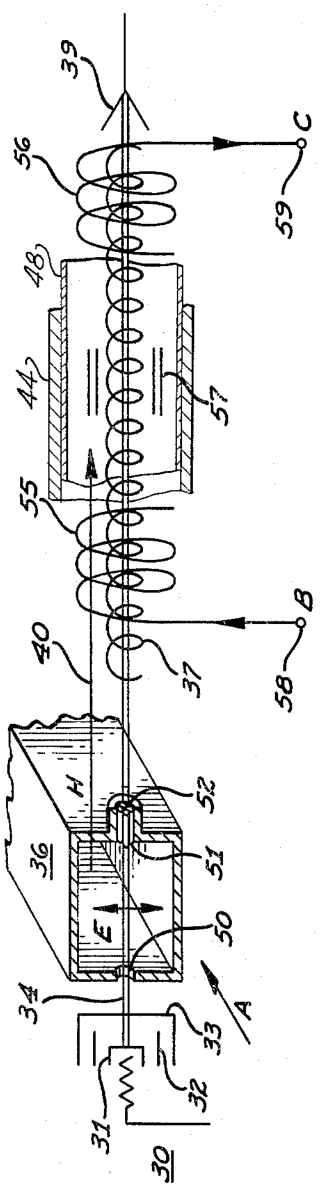
FIG. 4 is a schematic diagram of a high frequency device constructed in accordance with the teachings of the present invention.

Referring to FIG. 1, a theoretical electron path is shown as the electron is emitted from an electron source and travels in a magnetic field having lines of flux parallel to the direction of electron flow. The electron may emanate from any suitable source, and be propelled in the direction shown in FIG. 1 through an aperture 1 existing, for example, in an accelerating anode 2. The direction of electron flow is shown by the arrow 3, and the direction of the uniform magnetic field is shown by the arrow 4. It may be seen that the interaction of the electron with the uniform magnetic field causes the electron to follow a spiraling path. This spiraling path, looking into the direction of electron flow, would appear as the electron orbit 5 shown to the right of FIG. 1. The electron will travel the electron orbit 5 at a given angular velocity, that is, an angular velocity directly proportional to the strength of the magnetic field. The frequency of this orbital rotation, known as the cyclotron frequency, of an electron in a uniform magnetic field is independent of the electron's axial (direction of arrow 3) velocity. Thus, the electron traveling parallel to and in a uniform magnetic field will continue to describe a spiraling path of a definite orbital diameter and orbital, or cyclotron, frequency.

If an electric field is imposed on the electron in a direction transverse to the magnetic field, the spiraling path of the electron will be distorted; however, if the imposed electric field is caused to alternate at substantially the electron cyclotron frequency, the spiraling path of the electron exhibits an increasing orbital diameter. This latter condition is illustrated in FIG. 2. The end view of the spiraling electron path, as shown to the right of FIG. 2, illustrates the phenomena of cyclotron resonance wherein the electric field imparts an acceleration to the electron in alternate directions and wherein the electron is caused to follow an orbital path of increasing diameter. The electron cyclotron frequency is proportional to the magnetic field strength, and may be equated thus:

$$f_c = \frac{e\beta}{2\pi m}$$

where $\beta$ is the magnetic field strength, and $e/m$ is the charge-mass ratio of the electron. Thus, the resonance effect occurs when the applied alternating electric field is transverse to the magnetic field (and the axial direction of electron flow) and has a frequency equal to $f_c$. Assuming a sinusoidal alternation, $$E\ (\text{transverse}) = E \sin \omega_E t$$

then resonance occurs when $$\omega_E = \omega_c$$

Obviously, the resonance effect may be precipitated by varying $\beta$ (and thus $\omega_c$) as well as by varying $\omega_E$.

Referring to FIG. 3, an electron source 10 is provided for generating a stream of electrons 11; the electron stream passes through a wave guiding means 12, a slow-wave structure 13, and impinges on a collector 14. The wave guiding means 12 is supplied with electromagnetic signals from a signal source 15; slow-wave structure 13 is provided with electromagnetic signals from a signal source 16. The wave guiding means 12 is also provided with openings 17 to permit the passage of the electron stream therethrough, and the exit opening includes a grid structure 18 for inhibiting the flow of the electron stream under certain conditions. The output signal provided by the slow-wave structure 13 may be supplied to a utilization circuit 20 by a suitable coupling to the slow-wave structure at the collector end thereof. A uniform magnetic field is provided by any suitable means 21 and is directed along the electron stream 11 as indicated by the arrow 19.

In operation, the electron source 10 provides the continuous stream of electrons 11 traveling through the opening 17 and grid 18 of the wave guiding means 12 to the collector 14. Electromagnetic signals coupled to the slow-wave structure 13 from the signal source 16 are amplified through the interaction of the electron stream and the electromagnetic wave on the slow-wave structure and are provided, as amplified, to the utilization circuit 20 by suitable coupling at the collector end of the slow-wave structure. When an electromagnetic signal is provided by the signal source 15 to the wave guiding means 12, a transverse electric field is imposed on the electron stream 11 traveling therethrough; accordingly, each electron traversing the wave guiding means is subjected to this alternating electric field and, thus follows a distorted spiraling path. When the electromagnetic signals from the signal source 15 are of frequency substantially equal to the electron cyclotron frequency of the electrons in the electron stream, a cyclotron resonance phenomena occurs, and the spiraling path of each individual electron increases its respective diameter. As a consequence of this increasing orbital diameter, the electrons are unable to pass through the grid 18 and thus impinge thereon. The electron stream is thus effectively interrupted, and signals applied to the slow-wave structure from the signal source 16 are inhibited, and no signal will be provided to the utilization circuit 20.

Figure 5:
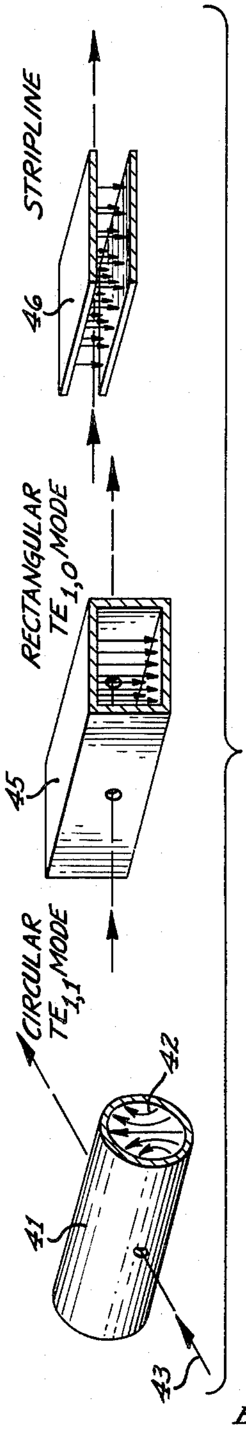
FIG. 5 is a schematic diagram of several modifications of a portion of the device shown in FIG. 4.

The specific components of the device shown in FIG. 3 may vary greatly; however, the invention is show in greater detail in FIG. 4 utilizing specific components to facilitate the description thereof. An electron source 30 is shown for providing a continuous stream of electrons. The electron source may be any convenient gun-type structure; the particular electron source shown includes an indirectly heated cathode 31, a focusing cylinder 32, and an apertured accelerating anode 33. The resulting electron stream 34 is directed through a wave guiding means 36, a slow-wave structure 37, to a collector 39. A uniform magnetic field, generally indicated by arrow 40, is directed axially along the electron stream by any suitable means, for example, solenoid 44 surrounding envelope 48. The wave guiding means 36 is shown in FIG. 4 as a rectangular hollow wave guide; however, any wave guiding means capable of sustaining a transverse electric mode may be utilized. For example, referring to FIG. 5, several wave guiding means are shown suitable for use in the apparatus of FIG. 4. A hollow circular wave guide 41 excited in the $TE_{1,1}$ mode provides a transverse electric field as generally indicated by the arrows 42. The stream of electrons, such as emanating from an electron source 30 in FIG. 4, is indicated in FIG. 5 by the dotted line 43. Similarly, rectangular hollow wave guide 45 excited in the $TE_{1,0}$ mode, and the stripling 46 are capable of sustaining transverse electric modes of electromagnetic wave propagation. Accordingly, any wave guiding means capable of sustaining a transverse electric field may be utilized in the device of the present invention.

Returning to FIG. 4 the wave guiding means 36, shown in FIG. 4 as a hollow rectangular wave guide, is provided with an opening 50 to admit the electron stream. A second opening 51 is provided in the wave guiding means 36 to permit the electron stream to exit from the wave guiding means. A grid 52 is provided for interrupting the electron stream when the wave guiding means is excited in a transverse electric mode by a signal having a frequency equal to the electron cyclotron frequency of electrons in the electron stream. The slow-wave structure 37 may be any type of wave-slowing arrangement suitable for propagating an electromagnetic wave therealong; the particular slow-wave structure chosen for illustration in FIG. 4 is a helical conductor positioned to admit the electron stream 34 along the axis of the helix. An electromagnetic signal may be coupled to the slow-wave structure 36, and the electromagnetic wave traveling therealong may be coupled off of the slow-wave structure, by any one of several known coupling arrangements. The method for coupling chosen for illustration in FIG. 4 comprises a superimposed helix 55, connected to an input terminal 58, coupling an incoming electromagnetic wave to the slow wave structure 37; correspondingly, a superimposed helix 56, positioned at the collector end of the slow-wave structure, and connected to an output terminal 59, may be utilized to couple the electromagnetic wave present on the slow-wave structure 37 and provide an output signal to a utilization circuit. An attenuation device 57, which may, in practice, simply comprise a lossy section in the slow-wave region between the coupling helices 55 and 56, is provided to isolate the electromagnetic radiations of coupling helix 55 from the output coupling helix 56.

The operation of the device shown in FIG. 4 may be described as follows. The electron source 30 provides a continuous stream of electrons flowing through the wave guiding means 36, the slow-wave structure 37, to the collector 39. The electron stream is confined to the path described with the aid of the uniform longitudinal magnetic field indicated by arrow 40. When an electromagnetic signal B is applied at input terminal 58 and coupled to the slow-wave structure 37 by coupling 55, the interaction of the electromagnetic wave and electron stream provide amplification of the former which may be sensed and coupled to a utilization circuit by the output coupling 56. The operation of the device in FIG. 4 has thus far corresponded to a traveling wave tube amplifier. When a signal A is applied to the wave guiding structure 36, and this signal establishes a transverse electric field, the electrons in the electron stream will experience a cyclotron resonance phenomena as described in connection with FIGS. 1 and 2. This cyclotron resonance will occur provided the signal A has a frequency substantially equal to the electron cyclotron frequency of the electrons in the electron stream. When this phenomena occurs, the electrons are intercepted in the grid structure 52 and prevented from passing to the vicinity of the slow-wave structure 37. As a consequence of the interception of the electron stream, any electromagnetic signal B applied to the input terminal 58 and the coupling device 55, will be prevented from producing an output signal on the coupling device 56 (and thus the output terminal 59) since the electron stream is not present to transfer energy to the latter. The attenuation device 57 is included to isolate electromagnetic wave radiations from coupling device 55 to coupling device 56 thus insuring that the only energy transferal from one coupler to the other is through the electron stream.

Figure 6:
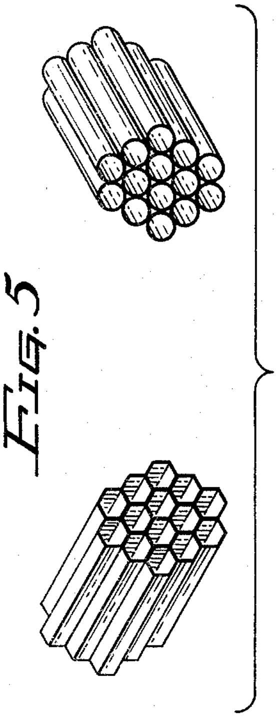
FIG. 6 shows enlarged grids useful in the device of FIG. 4.

The structure of the grid 52 may take several forms, and there may be any number of passages parallel to the axis of the electron stream. The diameter of the passage or passages is made small enough to insure that the individual electrons following their spiraling path of increasing orbital diameter will impinge on the walls of the grid. Representative structures of the grid 52 are shown in FIG. 6. It may be seen from an inspection of FIG. 6 that the cross sectional configuration of the individual passages is not critical, and the number of the passages and their particular arrangement may be dictated by other criteria. The maximum diameter of each of the passages, and the individual passage length, is determined by the orbital diameter of the electron path as the electrons exit from the wave guiding means.

The utilization of the device shown in FIG. 4 in a microwave computer may be seen by assuming that the input electromagnetic waves A and B are microwave digital signals of the pulse no-pulse variety. Each pulse thus comprises a burst of RF energy which is coupled to either the coupling device 55 or the wave guiding means 36. The operation of the device may thus be described as an inhibit gate. A truth table for an inhibit gate utilizing the variables A and B is shown in FIG. 7. An inspection of the truth table FIG. 7 reveals the fact that when A is a binary "0" (no pulse), the output of the gate is represented by whatever the input B is at that particular instant. Conversely, when the input variable A is a binary "1" (pulse), the output of the gate is always a binary "0." Applying the truth table of FIG. 7 to the device of FIG. 4, when no electromagnetic signal is applied to the wave guiding means 36, the output signal C is dependent solely on the electromagnetic signal B. When an electromagnetic signal A exists in the wave guiding means 36, the output signal C will always be a binary "0" (no pulse) since the electron stream is intercepted and no signal applied to the coupling device 55 can be transmitted to the coupling device 56.

The device of FIG. 4 may also be utilized as a negation gate and pulse reshaper (in microwave applications, a pulse is a burst of RF energy) by applying a clock pulse at input terminal 58 and the pulse to be reshaped and negated to the wave guiding means 36. Since the output signal is independent of the pulse deteriorations in the signal applied to the wave guiding means, the pulse will be reshaped and resynchronized with the clock signal applied to terminal 58, and will appear in negated form since a pulse applied to the wave guiding means 36 is associated with the absence of a pulse at the output coupling device 56. Thus, an absence of a pulse on wave guiding means 36, and a clock pulse on terminal 58, will result in a pulse at terminal 59.

As mentioned previously, the electron cyclotron resonance effect is precipitated by the equality of the electron cyclotron frequency and the transverse alternating electric field. The equality of frequency may be established by choosing a wave guide signal of proper frequency; alternatively, the magnetic field strength may be chosen to provide an electron cyclotron frequency equal to the wave guide signal frequency. To facilitate adjustment of the magnetic field strength, a separate magnetic field establishing means may be provided for the vicinity of the wave guiding means through which the electron stream flows. In this manner, adjustment of the magnetic field strength may be made without interfering with the longitudinal focusing magnetic field in the slow-wave area of the device. The device of the present invention therefore provides a convenient means for gating an electron stream, and a means for effectively gating electromagnetic signals in the microwave region of the frequency spectrum.

While the principles of the invention have now been made clear in illustrative embodiments, there will be immediately obvious to those skilled in the art many modifications in structure, arrangement, proportions, the elements, materials and components used in the practice of the invention, and otherwise, which are particularly adapted for specific environments and operating requirements, without departing from those principles. The appended claims are therefore meant to cover and embrace any such modifications, within the limits only of the true spirit and scope of the invention.

What is claimed as new and desired to secure by Letters Patent of the United States is:

1. In combination, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons in said electron stream.

2. In combination, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons in said electron stream, said means comprising a wave guiding means connected to a source of electromagnetic signals and having openings to permit the passage of said electron stream therethrough.

3. In combination, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons in said electron stream, said means comprising a wave guiding means connected to a source of electromagnetic signals and having openings to permit the passage of said electron stream therethrough, and a grid positioned within one of said openings to intercept the electrons in said stream when said electrons are acted upon by said alternating electric field.

4. In combination, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons in said electron stream, said means comprising a hollow rectangular wave guide having openings in the walls to permit the passage of said electron stream therethrough, and a source of electromagnetic signals connected to said wave guide.

5. In combination, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons in said electron stream, said means comprising a hollow rectangular wave guide having openings in the walls to permit the passage of said electron stream therethrough, a source of electromagnetic signals connected to said wave guide, and a grid positioned within one of said openings to intercept the electrons in said stream when said electrons are acted upon by said alternating electric field.

6. In combination, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons of said electron stream, said means comprising a wave guiding means connected to a source of electromagnetic signals and having openings to permit the passage of said electron stream therethrough, a grid positioned within one of said openings to intercept the electrons in said stream when said electrons are acted upon by said alternating electric field, said grid comprising a plurality of adjacent passages each parallel to said axis and each having a maximum diameter less than the maximum diameter of the orbit of a spiraling electron under the influence of said alternating electric field in said wave guiding means.

7. In combination, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons in said electron stream, said means comprising a wave guiding means connected to a source of electromagnetic signals and having openings to permit the passage of said electron stream therethrough, a grid positioned within one of said openings to intercept the electrons in said stream when said electrons are acted upon by said alternating electric field, said grid comprising a plurality of adjacent elongated passages each parallel to said axis and each having a maximum diameter less than the maximum diameter of the orbit of a spiraling electron under the influence of said alternating electric field in said wave guiding means.

8. A microwave gate comprising, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons of said electron stream, said means comprising a wave guiding means connected to a first source of electromagnetic signals and having openings to permit the passage of said electron stream therethrough, a second source of electromagnetic signals, means coupling said second source of electromagnetic signals to said slow-wave structure, an output terminal, and means coupling said terminal to said slow-wave structure.

9. A microwave gate comprising, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons of said electron stream, said means comprising a wave guiding means connected to a first source of electromagnetic signals and having openings to permit the passage of said electron stream therethrough, a grid positioned within one of said openings to intercept the electrons in said stream when said electrons are acted upon by said alternating electric field, a second source of electromagnetic signals, means coupling said second source of electromagnetic signals to said slow-wave structure, an output terminal, and means coupling said terminal to said slow-wave structure.

10. A microwave gate comprising, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons of said electron stream, said means comprising a hollow rectangular wave guide having openings in the walls to permit the passage of said electron stream therethrough and a source of electromagnetic signals connected to said wave guide, a second source of electromagnetic signals, means coupling said second source of electromagnetic signals to said slow wave structure, an output terminal, and means coupling said terminal to said slow-wave structure.

11. A microwave gate comprising, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons of said electron stream, said means comprising a wave guiding means connected to a first source of electromagnetic signals and having openings to permit the passage of said electron stream therethrough, a grid positioned within one of said openings to intercept the electrons in said stream when said electrons are acted upon by said alternating electric field, said grid comprising a plurality of adjacent elongated passages each parallel to said axis and each having a maximum diameter less than the maximum diameter of the orbit of the spiraling electron under the influence of said alternating electric field in said wave guiding means, a second source of electromagnetic signals, means coupling said source of electromagnetic signals to said slow-wave structure, an output terminal, and means coupling said output terminal to said slow-wave structure.

12. A microwave gate comprising, apparatus for propagating an electromagnetic wave along a slow-wave structure, an electron source for projecting an electron stream along an axis in proximity to said slow-wave structure to cause interaction between said electromagnetic wave and said electron stream, apparatus for providing a magnetic field along said axis and directed parallel thereto, means for interrupting said electron stream by establishing an alternating electric field transverse to said axis between said electron source and said slow-wave structure, the frequency of alternation of said electric field being substantially equal to the electron cyclotron frequency of the electrons of said electron stream, said means comprising a hollow rectangular wave guide having openings in the walls to permit the passage of said electron stream therethrough and a source of electromagnetic signals connected to said wave guide, a grid positioned within one of said openings to intercept the electrons in said stream when said electrons are acted upon by said alternating electric field, a second source of electromagnetic signals, means coupling said second source of electromagnetic signals to said slow-wave structure, an output terminal, and means coupling said terminal to said slow-wave structure.

References Cited by the Examiner

UNITED STATES PATENTS 2,789,246 4/57 Wang ---------------- 315—3.5
3,051,865 8/62 Marchese -------------- 315—3

GEORGE N. WESTBY, *Primary Examiner.*